United States Patent

Bray et al.

[11] Patent Number: 5,597,185
[45] Date of Patent: Jan. 28, 1997

[54] ONE PIECE TUBULAR ELBOW AND PROCESS OF MANUFACTURE

[75] Inventors: Verne Bray; Glen Hansen, both of Logan, Utah

[73] Assignee: Naco Industries, Inc., Logan, Utah

[21] Appl. No.: 342,389

[22] Filed: Nov. 18, 1994

[51] Int. Cl.⁶ .................................................. F16L 43/00
[52] U.S. Cl. ............................ 285/179; 264/285; 264/322; 264/339
[58] Field of Search ................................. 264/292, 285, 264/320, 322, 235, 346, 339; 285/179; 264/540

[56] References Cited

U.S. PATENT DOCUMENTS

| | | | |
|---|---|---|---|
| 3,291,670 | 12/1966 | Usab | 264/540 X |
| 3,352,960 | 11/1967 | McLaughlin | 264/339 |
| 3,606,669 | 9/1971 | Kemble | 264/339 |
| 3,719,737 | 3/1973 | Vaillancourt et al. | 264/292 |
| 3,752,438 | 8/1973 | Baillie | 285/179 X |
| 3,753,635 | 8/1973 | Barnett | 264/339 |
| 3,803,276 | 4/1974 | Megias | 264/339 |
| 4,048,409 | 9/1977 | Sugita et al. | 264/540 X |
| 4,385,089 | 5/1983 | Bonnebat et al. | 264/523 X |
| 4,440,712 | 4/1984 | Imgram | 264/285 |
| 4,545,947 | 10/1985 | Bozoarth et al. | 264/339 |
| 4,708,374 | 11/1987 | Cox . | |
| 4,876,049 | 10/1989 | Aoyama et al. | 264/322 |
| 5,178,817 | 1/1993 | Yamada et al. | 264/523 |
| 5,264,178 | 11/1993 | Yamamura et al. | 264/540 X |
| 5,316,706 | 5/1994 | Muni et al. | 264/346 |
| 5,324,001 | 6/1994 | Duke | 285/179 X |
| 5,384,085 | 1/1995 | Houser et al. | 264/320 |
| 5,407,613 | 4/1995 | Schulte | 264/339 |

Primary Examiner—Terry Lee Melius
Assistant Examiner—Heather Shackelford
Attorney, Agent, or Firm—Thorpe, North & Western, L.L.P.

[57] ABSTRACT

A one-piece tubular elbow fitting. A unitary conduit body includes continuous, generally cylindrical side walls having a seamless configuration characterized by an absence of bumps and grooves at an inner surface thereof. The side walls are curved in an axial direction to define a flow channel having an axially arcuate flowpath and a generally circular cross section. The molecular structure of the conduit body includes former non-crystalline portions which have been reoriented and aligned to form stronger, crystalline molecular structure.

8 Claims, 2 Drawing Sheets

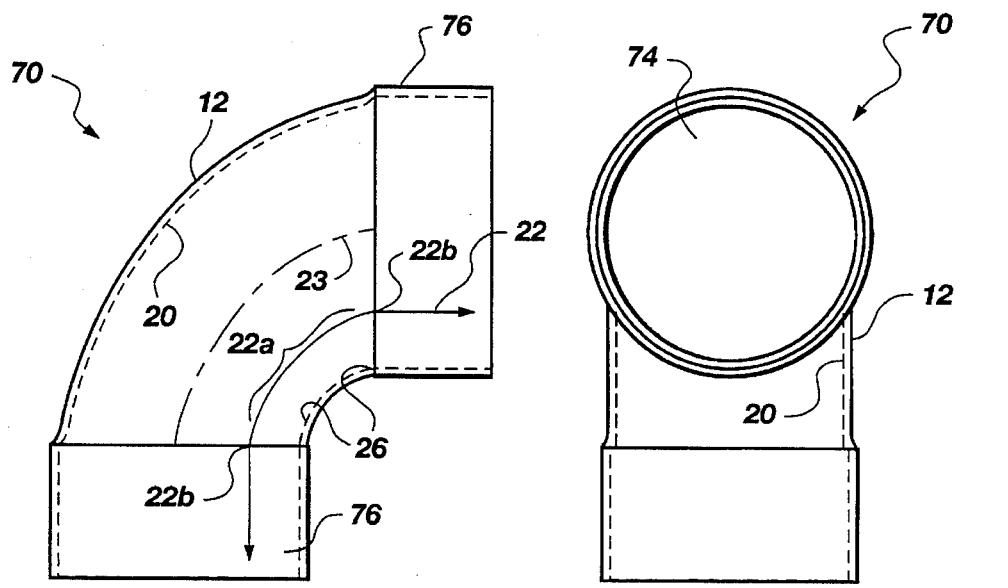
Fig. 2  Fig. 3
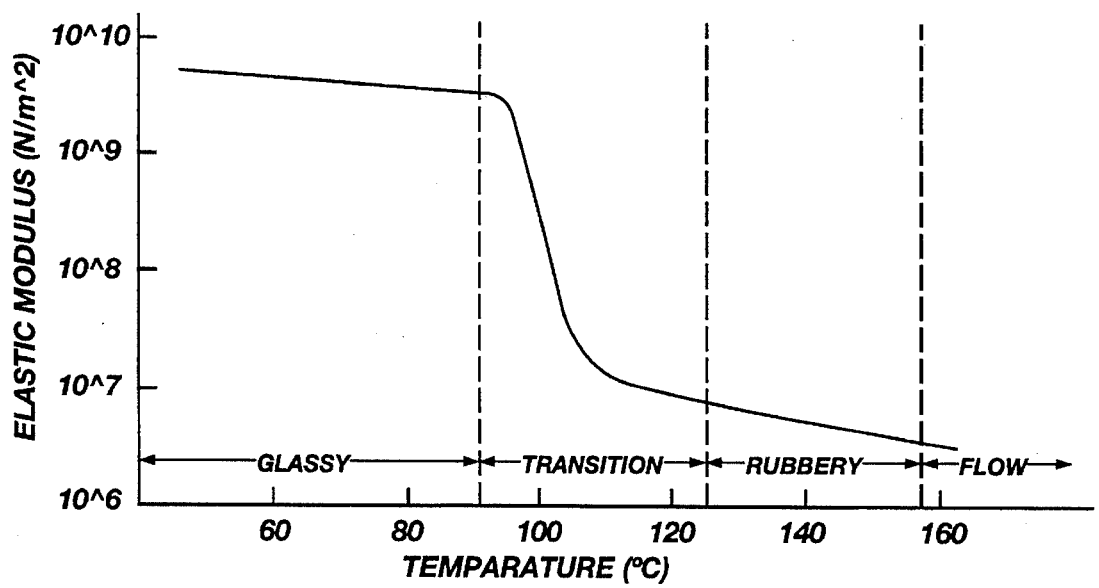
Fig. 4

ONE PIECE TUBULAR ELBOW AND PROCESS OF MANUFACTURE

BACKGROUND OF THE INVENTION

1. The Field of the Invention

The present invention relates generally to the field of pipe fittings. More particularly, it concerns a one piece tubular elbow fitting made from existing plastic pipe.

2. The Background Art

Polyvinyl chloride is a white, water-insoluble thermoplastic material, commonly referred to as PVC, which is often used to make pipe and pipe fittings. PVC pipe is rigid and lightweight, and is often used in the construction of water and sewer systems. The associated pipe fittings such as tees, elbows and the like are typically made from PVC material by injection molding processes and fabrication. Some 90-degree elbow fittings are injection molded directly, while others are made by fastening together two thermoformed or fabricated 45-degree elbows in an end-to-end configuration.

The prior art PVC elbows are characterized by a number of disadvantages..The injection molding process can be expensive and time-consuming, and does not produce a PVC fitting having maximum strength. While the injection molded fitting can provide a one-piece 90-degree elbow with a standard radius, the flow characteristics are downgraded in comparison to an elbow with a long radius. The method of fastening elbow fittings end-to-end produces a seam in the flow channel which introduces bumps and/or grooves at an inner surface of the fitting, thereby increasing friction and head loss. Of current interest are one-piece PVC elbow fittings having increased strength, seamless side walls, and providing flow characteristics of a long radius elbow while having an overall radius similar to a standard 90-degree elbow, and methods of making the same.

OBJECTS AND SUMMARY OF THE INVENTION

It is therefore an object of the present invention to provide a unitary, one-piece tubular elbow fitting constructed from rigid plastic material which minimizes friction and head loss while providing the advantage of a standard 90-degree elbow.

It is another object of the invention to provide such an elbow fitting having increased strength.

It is a further object of the invention, in accordance with an aspect thereof, to provide a method of manufacturing such an elbow fitting which utilizes existing rigid plastic pipe.

The above objects and others not specifically recited are realized in a specific illustrative embodiment of a one-piece tubular elbow fitting. A unitary conduit body includes continuous, generally cylindrical side walls having a seamless configuration. The side walls are curved in an axial direction to define a flow channel having an axially arcuate flowpath and a generally circular cross section. The molecular structure of the conduit body includes former noncrystalline portions which have been reoriented and aligned to form stronger, crystalline molecular structure.

An illustrative method of manufacturing a tubular elbow as described above utilizes existing plastic pipe. A rigid plastic pipe is selected and heated to a pliable state. The heated pipe is bent into an elbow configuration, thereby stretching some regions of the pipe resulting in harder, crystalline molecular structure in the resulting product. The bent portions of the pipe are reformed so as to define a circular cross section.

Additional objects and advantages of the invention will be set forth in the description which follows, and in part will be apparent from the description, or may be learned by the practice of the invention. The objects and advantages of the invention may be realized and obtained by means of the instruments and combinations particularly pointed out in the appended claims.

BRIEF DESCRIPTION OF THE DRAWINGS

The above and other objects, features and advantages of the invention will become apparent from a consideration of the subsequent detailed description presented in connection with the accompanying drawings in which:

FIG. 2 illustrates a side view of a unitary one-piece tubular elbow fitting made in accordance with the principles of the present invention;

FIG. 3 illustrates a front view of the elbow fitting of FIG. 2; and

FIG. 4 illustrates four regions of viscoelastic behavior for plastics in the form of elastic modulus versus temperature.

DETAILED DESCRIPTION OF PRESENTLY PREFERRED EMBODIMENTS

Figure 1:
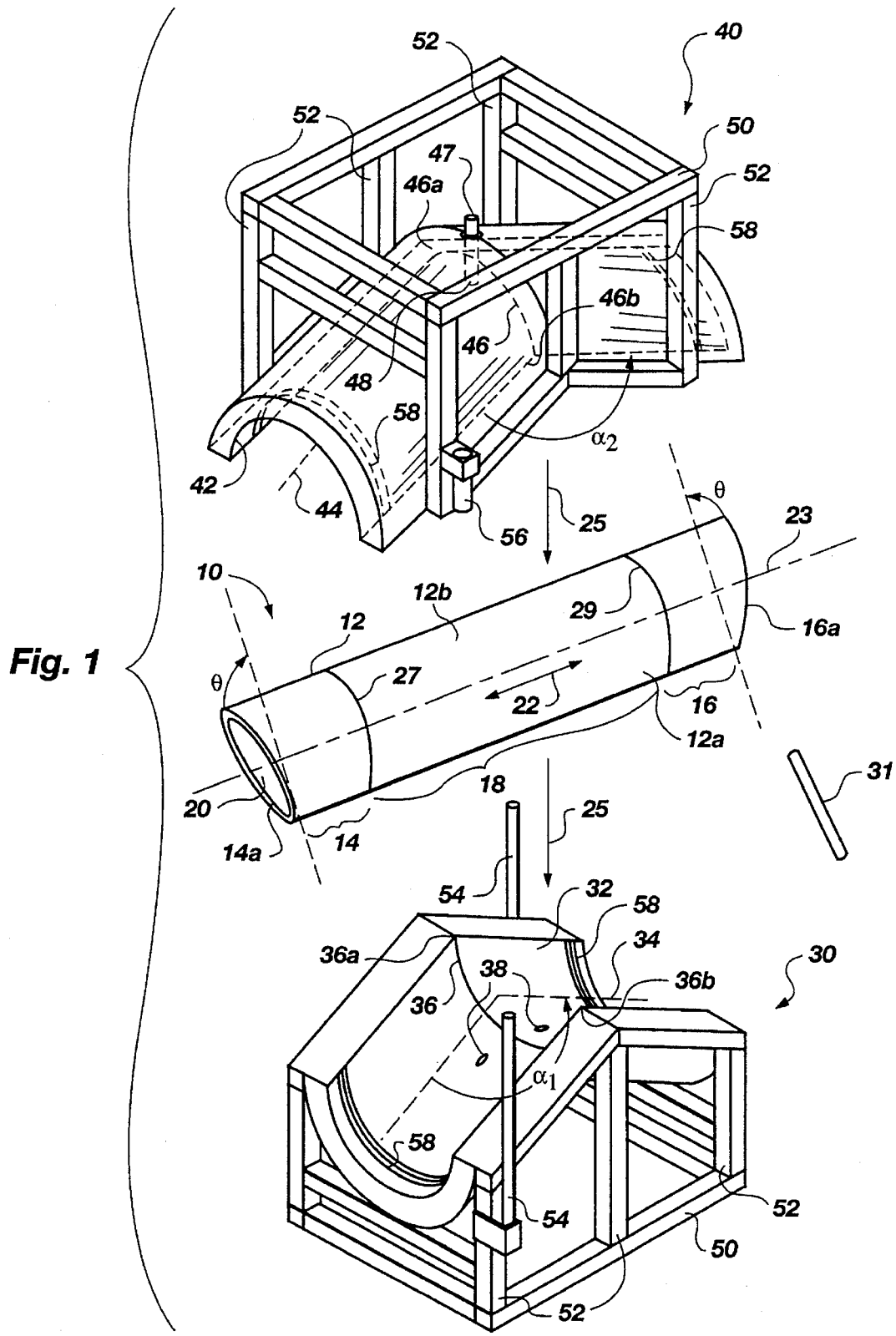
FIG. 1 illustrates an exploded view of components used in a molding process in accordance with the principles of the present invention.

Referring now to FIG. 1, there is shown a piece of pipe, generally designated at 10, made from polyvinyl chloride material ("PVC"). The present invention involves forming an elbow fitting from an existing piece of rigid plastic pipe, preferably PVC pipe 10, as opposed to the conventional methods of injection molding.

The pipe 10 includes cylindrical side walls 12, first and second opposing ends at bracket 14 and bracket 16, respectively, a central section at bracket 18, and first and second end faces 14a and 16a. The side walls 12 include a continuous interior surface 20 to thereby define a flow channel having a flowpath 22. The cylindrical nature of the pipe defines a longitudinal axis or axial direction 23 with which the flowpath 22 corresponds.

The present invention involves the use of first and second molds 30 and 40, respectively. The first mold 30 includes a first semi-cylindrical mold surface 32 and an associated axial direction or orientation 34. The first mold surface 32 includes a semi-cylindrical male corner portion 36 and defines an angle $\alpha_1$ about the male corner portion. The male corner portion 36 includes first and second terminuses 36a and 36b. The first mold surface 32 further includes vacuum ports 38. The second mold 40 includes a second semicylindrical mold surface 42 and axial direction 44. The second mold surface 42 includes a semi-cylindrical female corner portion 46 and defines an angle $\alpha_2$ about the female corner portion, which includes terminuses 46a and 46b. The angles $\alpha_1$ and $\alpha_2$ are both preferably 45-degrees. The second mold 40 further includes a vacuum channel 47 which forms a vacuum port 48 in the second mold surface 42. It is to be understood that the term "semi-cylindrical" as used herein shall refer broadly to any partially-circular shape and is not to be limited to an exact half circle.

The phrases "semi-cylindrical male corner portion" 36 and "semi-cylindrical female corner portion" 46 should be intuitively understood by inspection of FIG. 1. A male corner as used herein refers to a corner which protrudes, such as the edge of a book, and is not limited to sharp corners but may be a rounded section and includes any protruding component no matter how subtle. A female corner as used herein refers to a corner which extends inward instead of protruding, such as the inside corner of a box, and is likewise not limited to sharpness but includes rounded sections. The distinction between male and female corners can be understood by inspection of the semi-cylindrical corner portion 46 in FIG. 1 as compared to the male corner portion 36.

The molds 30 and 40 are preferably made from steel, fiberglass or aluminum tubing, or from a combination thereof. Each mold includes a support frame 50 having support rods 52 secured to the mold in any suitable manner. Connecting rods 54 extend from the first mold 30, and corresponding receptors 56 are secured to the second mold 40 for matingly receiving the connecting rods therein. Semicylindrical sealing gaskets 58 are disposed at opposing ends of each mold surface.

FIGS. 2–3 illustrate a unitary, one-piece tubular elbow fitting, generally designated at 70 and made from the pipe 10 of FIG. 1. The elbow fitting 70 is a conduit body having continuous, generally cylindrical side walls 12 having a seamless configuration. The cylindrical side walls 12 are curved in an axial direction 23 to define a flow channel having an axially arcuate flowpath 22 and a generally circular cross section 72. The term "arcuate flowpath" as used herein shall refer broadly to any nonlinear path or directional change, and shall not be limited to a continuous curvilinear arc. The arcuate flowpath 22 includes a central 45-degree curve 22a and a pair of opposing 22.5 degree curves 22b for a total directional change of 90 degrees. It will be understood from the description above of sharp male corner edges that, although there is an absence of bumps and grooves in the interior surface, the opposing 22.5 degree curves 22b of the unitary one-piece elbow 70 may form sharp-angled corners in the side walls 12 such that the side walls 12 are sufficiently curved to form interior male corner edges 26 (which are not bumps or grooves) in the side walls, as shown in FIG. 2.

The elbow fitting 70 of FIGS. 2–3 is preferably made by an illustrative method, which includes the steps of:

(a) selecting the rigid plastic pipe 10, and cutting the end faces 14a and 16a such that they are slanted to define an approximately 22.5 degree angle relative to the longitudinal axis or direction 23;

(b) heating the pipe 10 to a pliable state, and cooling the first and second opposing ends 14 and 16 to a rigid state while maintaining the central section 18 in a pliable state;

(c) placing the heated pipe 10 between the first and second molds 30 and 40, and contactably sandwiching the pipe between the first and second mold surfaces 32 and 42 as indicated by the arrows 25, so that first side walls 12a of the pipe contact the semi-cylindrical male corner portion 36 and face the first mold surface 32 and opposing second side walls 12b face the second mold surface 42, to thereby bend and re-form the heated pipe into an elbow configuration of approximately 45 degrees so as to form a flow channel therein having an axially arcuate flowpath, and such that each opposing end 14 and 16 of the pipe is sealably circumscribed by the sealing gaskets 58 to thereby seal portions of the first and second opposing side walls 12a and 12b to the first and second mold surface 32 and 42, respectively, to respectively form first and second closed cavities between the side walls of the pipe 10 and the mold surfaces;

(d) applying subatmospheric pressure to the vacuum ports 38 and to the vacuum channel 47, which respectively communicate with the first and second closed cavities, to thereby pull deformed portions of the side walls 12 radially outward and toward the first and second mold surface 32 and 42, respectively, to further re-form the side walls of the pipe to define a generally circular cross section; and (e) cooling the pipe and removing it from the molds;

(f) belling each opposing end 14 and 16 as known in the art to thereby bend each of the ends to an angle of approximately 22.5 degrees to thereby provide the flowpath 22 (FIG. 2) with an approximately 90-degree change in axial direction, and to form bell-ends 76 (FIG. 2).

The steps of the present inventive method are not to be limited to a specific order, and include numerous variations which are captured within the scope of the appended claims. The first and second molds 30 and 40 are preferably preheated to a temperature of approximately 150° Fahrenheit prior to step (b) above. Applicants have discovered, empirically, that preheating the molds helps enhance the heating and reforming of the pipe. It will be appreciated that slanting the ends faces 14a and 16a makes it easier to bell the ends 14 and 16 into 22.5 degree bends since the ends need not be stretchably bent as far in order to achieve the bends.

One of the advantageous by-products of the present invention is increased strength of the PVC material. The bending of the pipe 10 causes portions of the plastic material to stretch such that non-crystalline molecular structure is reoriented and aligned into crystalline molecular structure which is harder and stronger. As the tensile loading of the stretched portions increases, crystallinity of the molecules takes place. The amount of crystalline molecular structure formed is dependant on the stretching and upon the cooling rate, in that the more the plastic is stretched and the faster it is thereafter cooled, the more crystalline molecular structure is formed. The molecules become aligned such that intermolecular forces induce further molecular alignment which forms a thinner region in the plastic. The ordered material of the thinner, crystalline region is significantly stronger than the undeformed areas of the pipe 10.

Since increased stretching increases the amount of crystalline molecular structure, the pipe 10 is preferably heated to relatively high temperatures for maximum stretching. FIG. 4 illustrates the four regions of viscoelastic behavior in plastics, glassy, transition, rubbery, and flow, in terms of the elastic modulus versus temperature. The elastic modulus is used to describe the capacity of a material to resist deformation, such that the lower a material's elastic modulus the more it can be stretched. As seen in FIG. 4, the elastic modulus decreases with increasing temperature. It is preferable to bend the pipe 10 after it has been heated to the flow region of viscoelastic behavior, preferably to within a range of 250° Fahrenheit to 280° Fahrenheit, and most preferably to 265° Fahrenheit. However, the pipe may be bent and formed in other regions, such as the rubbery region. The pipe 10 is preferably allowed to cool to approximately 150° Fahrenheit before being removed from the molds, and most preferably during a time interval within a range of approximately thirty seconds to sixty seconds.

The method of the present invention can be further enhanced in the following ways. The pipe 10 can be heated using any suitable method, such as by submersion in a glycol bath, inserted into a fluidized bed furnace, or covered with silicone heat blankets. Referring to FIG. 1, first and second boundary lines 27 and 29 can be marked with a grease pencil 31 as known in the art to respectively separate the first and second ends 14 and 16 from the central section 18 of the pipe 10. The boundary lines 27 and 29 act as heating and cooling lines, in that during step (b) above the ends 14 and 16 can be cooled without cooling any portion of the pipe 10 beyond the lines.

The process as described above can be enhanced by sealing the ends 14 and 16 of the pipe 10 and applying compressed air inside the pipe. For example, 50 psi of compressed air contained within the pipe will aid in pulling the side walls 12 of the pipe radially outward during application of the subatmospheric pressure. A subatmospheric pressure of at least twenty inches of vacuum is preferable. It should also be noted that the process can be achieved using vacuum alone, vacuum in combination with compressed air, compressed air alone, or suitable mechanical procedures.

It will be appreciated that the invention as described above results in a substantially continuous interior surface 20 which is curved in an axial direction to define a flow channel having an axially arcuate flowpath and a generally circular cross section. The resulting seamless nature operates to minimize friction and head loss, thereby permitting for increased flow through the elbow fitting 70. It will be further appreciated that successfully bending plastic pipe such of PVC pipe would seem to result in collapsing of the walls of the pipe so as to render the pipe useless. Applicants' discovery is thus a nonintuitive, novel approach to the formation of a plastic elbow fitting. The inventive process described is effective for any size of plastic PVC pipe, including PVC pipe having diameters of six inches and eight inches.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A one-piece tubular elbow comprising:

a unitary one-piece conduit body defining a long axis extending in a longitudinal direction and including continuous, generally cylindrical side walls having a seamless configuration, said side walls being curved in an axial direction to define a flow channel having an axially arcuate flowpath and a generally circular cross section, said conduit body being constructed from continuous rigid plastic conduit having an unoriented molecular structure which has been oriented and aligned to form stronger, oriented molecular structure, wherein the oriented and aligned molecular structure comprises stretched regions of the plastic conduit body, said stretched regions comprising noncircumferential stretching in the longitudinal direction on at least one side of the conduit body.

2. A one-piece tubular elbow as defined in claim 1, wherein the conduit body further comprises a tubular elbow made from PVC material, and wherein the axially arcuate flowpath of the flow channel is characterized by at least a 90-degree change in axial direction.

3. A one-piece tubular elbow as defined in claim 2, wherein the circular cross section of the flow channel has an inner diameter which is greater than four inches.

4. A one-piece tubular elbow as defined in claim 3, wherein the inner diameter of the circular cross section is greater than six inches.

5. A one-piece tubular elbow as defined in claim 1, wherein the side walls are sufficiently curved to form such a sharp-angled corner that at least one interior male corner edge is formed in said side walls.

6. A one-piece tubular elbow comprising:

a unitary one-piece conduit body defining a long axis extending in a longitudinal direction and including continuous side walls which are curved in an axial direction to define a flow channel having an axially arcuate flowpath and a generally circular cross section, said conduit body being constructed from existing continuous rigid plastic conduit having an unoriented molecular structure which has been oriented and aligned to form stronger, oriented molecular structure, wherein the oriented and aligned molecular structure comprises stretched regions of the plastic conduit body said stretched regions comprising noncircumferential stretching in the longitudinal direction on at least one side of the conduit body, the side walls having an inner diameter which is greater than four inches.

7. A one-piece tubular elbow as defined in claim 6, wherein the inner diameter of the side walls is greater than six inches.

8. A one-piece tubular elbow comprising:

a unitary one-piece conduit body including continuous side walls which are curved in an axial direction to define a flow channel having an axially arcuate flowpath and a generally circular cross section, said conduit body being constructed from existing continuous rigid plastic material having an unoriented molecular structure which has been oriented and aligned to form stronger, oriented molecular structure, said oriented molecular structure being sufficiently curved to form such a sharp-angled corner that at least one interior male corner edge is formed in said side walls.

* * * * *